J. M. DAY.
DEVICE FOR OPENING, HOLDING, PRESERVING, AND USING CANNED MILK AND OTHER CANNED FLUIDS.
APPLICATION FILED SEPT. 12, 1911.

1,041,971.

Patented Oct. 22, 1912.

2 SHEETS—SHEET 1.

WITNESSES

INVENTOR

J. M. DAY.
DEVICE FOR OPENING, HOLDING, PRESERVING, AND USING CANNED MILK AND OTHER CANNED FLUIDS.
APPLICATION FILED SEPT. 12, 1911.
1,041,971.
Patented Oct. 22, 1912.
2 SHEETS—SHEET 2.
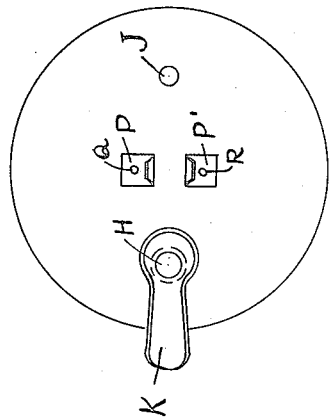
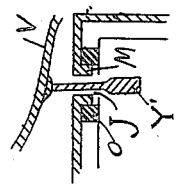
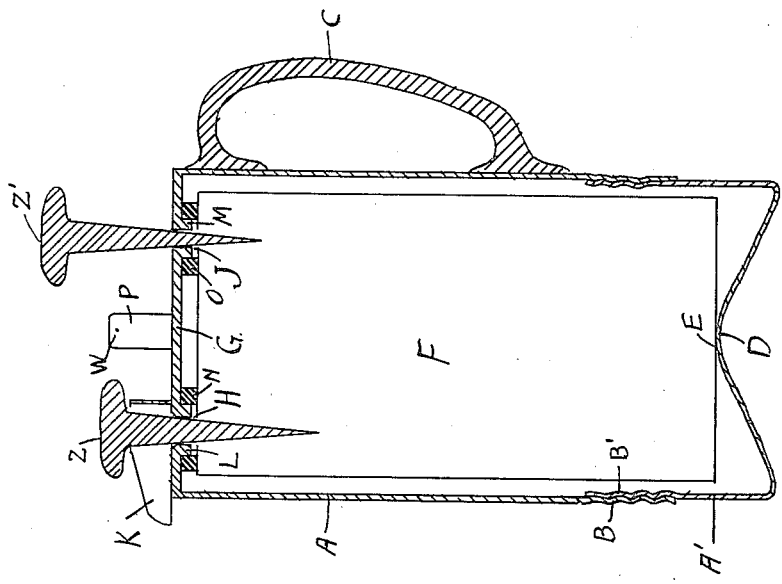
WITNESSES
INVENTOR

UNITED STATES PATENT OFFICE.

JOHN MILLS DAY, OF SEATTLE, WASHINGTON.

DEVICE FOR OPENING, HOLDING, PRESERVING, AND USING CANNED MILK AND OTHER CANNED FLUIDS.

REISSUED 1,041,971. Specification of Letters Patent. Patented Oct. 22, 1912.

Application filed September 12, 1911. Serial No. 648,973.

*To all whom it may concern:*

Be it known that I, JOHN MILLS DAY, residing at 5405 Roxbury avenue, at Montera Station, in the city of Seattle, county of King, and State of Washington, have invented certain new and useful Improvements in Devices for Opening, Holding, Preserving, and Using Canned Milk and other Canned Fluids; and I do hereby declare that the following is a full, clear, and exact description of my invention, such as will enable others skilled in the art to which it appertains, to make and use the same, reference being had to the accompanying drawings, which form a part of this specification.

This invention relates to improvements in devices for opening, holding, preserving and using canned fluids, especially canned milk.

The principal object of the invention is to provide a simple, convenient and inexpensive apparatus and receptacle in which cans of condensed or preserved milk or other liquid or fluid foods may be placed, opened and kept in a sanitary manner for convenient use.

It is a well known fact that when condensed milk is opened and poured out from the can, in which it is originally placed, into other vessels, or said can be allowed to remain standing open so the air may get at the milk, the milk becomes contaminated and quickly ferments and spoils, and this invention is especially designed for the purpose of providing a simple and convenient means of using the milk directly from the can and at the same time keeping the can air tight so that it may not so readily spoil, and so that it may not be contaminated.

The invention consists in the construction, arrangement and combination of parts as hereinafter set forth, pointed out in my claim and illustrated in the accompanying drawings, in which—

Figure 2:
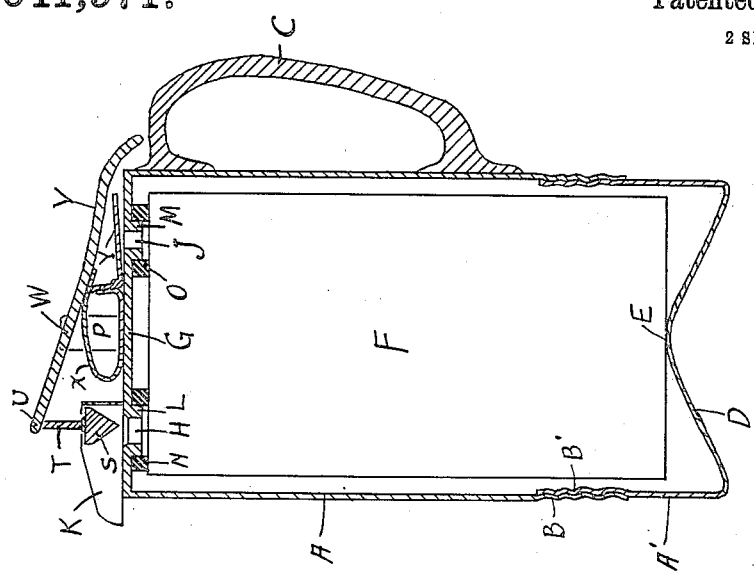
Figure 1:
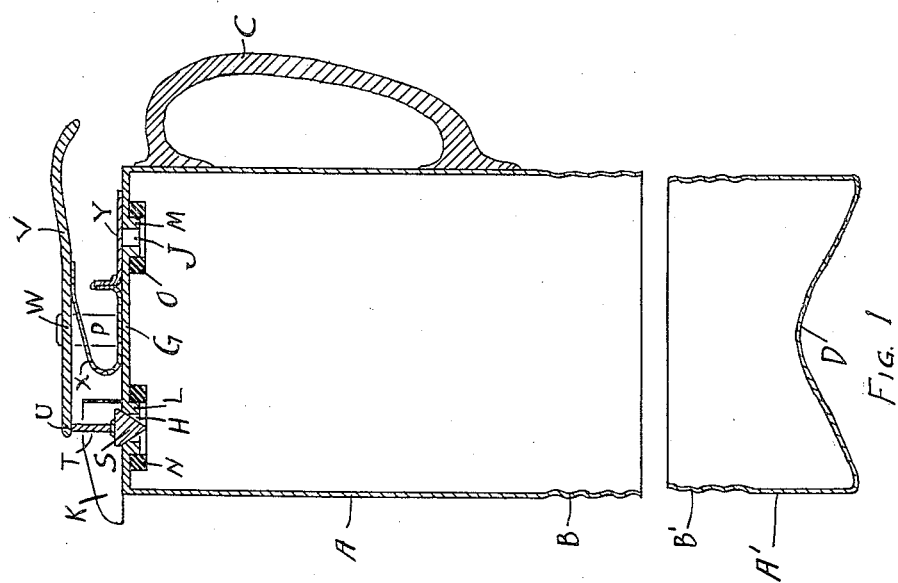

Figure 1. is a detail vertical section through my device showing the bottom portion thereof separated from the top. Fig. 2. is a detail vertical section through the device showing a can of milk in place therein ready to be used. Fig. 3. is a detail vertical section through my device with the valves removed showing the manner in which the can is opened while contained therein. Fig. 4. is a top plan view with the valves removed. Fig. 5. is a vertical section through a portion of the top showing a broken section of the lever, top of the device, top of the can and the modification of the air valve scheme.

Like letters of reference designate corresponding parts in all figures of the drawings.

The device consists of a casing formed in two parts, A and A', each part threaded as at B and B' so that they may be threaded or screwed together as shown in Figs. 2 and 3, the upper portion preferably being made to thread outside of the lower portion so that fluids may not run down along the outside of the casing instead of the lower part thereof. This casing is made preferably of sheet metal formed by staffing, or in any other convenient or proper manner, and may be enameled or plated, if so desired, and should be of sufficient heft and strength to withstand the necessary and ordinary strain placed upon it in use.

The casing is provided with a handle, C, for handling the device in carrying and pouring the liquid therefrom.

The lower portion of the casing, A', is provided with a base portion or bottom, D, which is convex in form on the inner or upper surface, at or near the center, the purpose of this convex formation being to provide as small a point of contact, as at E in Figs. 2 and 3, between the base portion A' and the cam F, and thus reducing the necessary friction in securing the can within the casing.

The top portion, G, of the casing is provided with two openings, H and J, the opening H being the larger and being provided with a spout, K, for pouring out the liquid contained in the can F, while the opening J provides an ingress for air so as to permit of the free flow of liquid from the egress or opening H. If desired, this opening, J, may be omitted entirely provided, of course, that the opening H is made of sufficient size to permit of the free ingress of air and egress of the contents of the can F at the same time. The openings, H and J, are each surrounded on the under or inside with a flange L and M respectively, over which flanges respectively, are fitted washers, N and O, said washers being somewhat thicker than the depth of the flanges, and being composed of some flexible material, preferably rubber.

The top of the casing, G, is provided with two ears or supports, one of which is shown as P in Figs. 1, 2, 3 and 4 of the drawing, and the other of which is shown as P' in Fig. 4 only. These ears or supports are preferably made of spring steel or brass and are secured to the top, G, in any manner that may be desired, but preferably by laying over or bending the lower portion of the ears or supports and securing them to the top by rivets as shown at Q and R in Fig. 4.

The opening, H, is provided with a valve S shaped preferably in the form of an inverted cone as shown in Figs. 1 and 2 which may be made in the form of a ball, or half ball, instead. This valve, S, is secured to or formed with an arm member, T, which arm member is hinged at U with a lever V. This lever, V, is provided with lateral members forming pivotal bearings with openings or eyelets in the ears or supports, P and P', at W. Secured either to the lever V or to the upper side of the top, G, is a spring X, which, by exerting pressure upward upon the free arm of the lever, V, forces the valve S into and closes the opening H.

A valve, Y, closes the opening J. This valve is so formed that when pressure is exerted on the upper side of the lever V, directly above the handle, C, the valve S will be lifted and at the same time the valve, Y, be tipped to permit of the ingress of air as shown in Fig. 2. This valve, Y, may be held closed by its own gravity or the spring, X, may be curved and brought in contact with it to exert pressure against the perpendicular portion thereof for that purpose.

The device is operated in the following manner:—The parts A and A' of the casing are separated by unscrewing, and the lever V is removed by spreading apart the supports or ears, P and P'. The upper part of the casing is then inverted and a can of milk or other fluid is placed therein, resting upon the washers N and O. The bottom part of the casing A', is threaded upon the upper part and screwed tightly so that the top of the can is forced against the washers, N and O. The entire device is then placed right side up and an awl, similar to those shown as Z and Z' is driven into the can through the openings, H and J, respectively, and the openings thus made in the can through the openings in said top corresponding in size with the openings in the top. The lever, V, with its accompanying spring, X, and valve, S, are then replaced on the device and it is ready for use.

This device may be varied in its construction in numerous ways. For instance, a spring of a different shape or style may be used to force the valve, S, into and close the opening, H. A valve similar to the valve, S, may be used in place of the valve, Y, or a wire plunger, Y', may be attached to the lever, V. This plunger is made smaller toward its upper portion, but of the proper size to closely fit the opening, J, at its lower extremity, so that when the lever V, is pressed downward, the air may pass in about the smaller portion of this plunger Y', and when the pressure is relieved, and the lever V again rises, the larger portion of the said plunger is forced upward into and closes the opening, J. And

Having thus fully described my invention and the construction and operation of the same, what I claim as new and desire to secure by Letters Patent is—

A holder for fluid containers and the like comprising a casing composed of separable top and bottom sections, and adapted to inclose the container, the top of the casing having outlet and vent openings, a support on the top of the casing, a lever removably pivoted to the support, a valve for the outlet opening carried by the lever, a valve for the vent opening pivoted to the top of the casing, said valve having an upstanding stem engageable by the lever to operate said valve when the lever is swung to operate the first-mentioned valve, and a spring engageable with the lever to swing the same in a direction to close the valves.

In testimony whereof I hereunto set my hand this 25th day of August, 1911 in the presence of two witnesses.

JNO. MILLS DAY

Witnesses:
 ROBT. L. SARGISSON,
 GEORGE R. DEAN.